United States Patent Office 3,780,091
Patented Dec. 18, 1973

3,780,091
ARYL-N-ALKYLCARBAMATES
Arnold D. Gutman, Berkeley, Calif., assignor to Stauffer Chemical Company, New York, N.Y.
No Drawing. Filed Dec. 29, 1971, Ser. No. 217,696
Int. Cl. C07c 125/06
U.S. Cl. 260—479 C            1 Claim

ABSTRACT OF THE DISCLOSURE

Novel substituted aryl-N-alkylcarbamates are disclosed. The compounds are useful as insecticides.

---

This invention relates to novel compositions of matter and to their use as insecticides. More particularly, the invention relates to compounds having the formula:

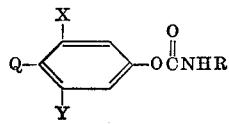

wherein R is alkyl containing 1 through 4 carbon atoms; X is selected from the group consisting of hydrogen and alkyl containing 1 through 6 carbon atoms; Q is selected from the group of hydrogen and

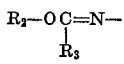

wherein $R_2$ is alkyl containing 1 through 6 carbon atoms, and $R_3$ is selected from the group consisting of hydrogen and alkyl containing 1 through 6 carbon atoms; and Y is selected from the group consisting of hydrogen, alkyl containing 1 through 6 carbon atoms, or

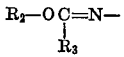

wherein $R_2$ is alkyl containing 1 through 6 carbon atoms, $R_3$ is selected from the group consisting of hydrogen and alkyl containing 1 through 6 carbon atoms; provided that when Q is hydrogen, Y is

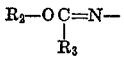

wherein $R_3$ is alkyl containing 1 through 4 carbon atoms, and when Q is

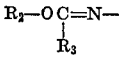

alkyl containing 1 through 6 carbon atoms. In its preferred form, the invention relates to novel compositions of matter having the formula:

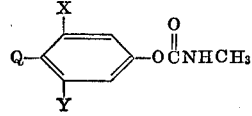

wherein X is selected from the group consisting of H and alkyl containing 1 through 4 carbon atoms; Q is selected from the group consisting of hydrogen and

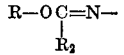

wherein R is alkyl containing 1 through 6 carbon atoms, $R_2$ is selected from the group consisting of hydrogen, and alkyl containing 1 through 4 carbon atoms; and Y is selected from the group consisting of hydrogen, alkyl containing 1 through 4 carbon atoms, and

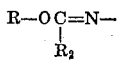

wherein R is alkyl containing 1 through 6 carbon atoms, and $R_2$ is selected from the group consisting of hydrogen and alkyl containing 1 through 4 carbon atoms; provided that when Q is hydrogen, Y is

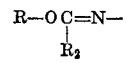

wherein $R_2$ is alkyl containing 1 through 4 carbon atoms, and when Q is

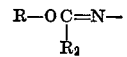

Y is alkyl containing 1 through 4 carbon atoms, and the use of thse compounds as insecticides. In its most preferred form, the invention relates to novel compositions of matter having the formula:

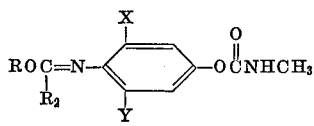

wherein X is selected from the group consisting of H and alkyl containing 1 through 6 carbon atoms; R is alkyl containing 1 through 6 carbon atoms, $R_2$ is selected from the group consisting of hydrogen and alkyl containing 1 through 4 carbon atoms; and Y is selected from the group consisting of hydrogen and alkyl containing 1 through 6 carbon atoms, and the use of these materials as insecticides.

In general, the compounds of the invention may be prepared by reduction of a suitable nitroaryl-substituted carbamate, followed by condensation of the resulting aminoaryl-substituted carbamate with an orthoester. Thus, R in the described formula may be varied in the compounds produced simply by varying the composition of the nitroarylcarbamate employed. Similarly, the position of the substituted imino group will depend on the position of the nitro group in the original starting material. In order to illustrate the invention more fully, reference is made to the following examples which demonstrate the preparation of the compounds of the invention:

EXAMPLE 1

About 58.3 grams of iron, 4.12 milliliters of 37 percent HCl, 68.6 milliliters of water, and 85.7 milliliters of ethanol are combined in a reaction flask and stirred and heated to reflux. The heat is then removed and 72 grams (0.343 mole) of 4-nitro-m-tolyl-N-methyl-carbamate are added at such a rate that a steady reflux is maintained. After the addition is complete, the reaction mass is allowed to cool to 65° C., and the pH is adjusted to 7 with 50 percent NaOH solution.

The reaction mass is then filtered hot through dicalite. The filtrate is concentrated in vacuo and the residue is taken up in 300 milliliters of chloroform. The chloroform solution is washed with two 100 milliliter portions of water, dried with anhydrous $MgSO_4$, and evaporated in vacuo to yield a crude product. The crude product is then washed with three 150 milliliter portions of diethyl ether and dried to yield 40.0 grams of 4-amino-m-tolyl-N-methylcarbamate having a melting point of 116–121° C.

EXAMPLE 2

4-[N-(O-ethyl formimino)]-m-tolyl-N-methyl carbamate

Approximately ten grams (0.055 mole) of 4-amino-m-tolyl-N-methylcarbamate, 14.8 grams (0.1 mole) of triethylorthoformate, about 50 milliliters of acetonitrile, and 0.2 milliliters of alcoholic HCl are combined in a flask and heated on a steam bath until the reaction temperature reached 100° C. The reaction mixture is then stripped in vacuo of excess orthoformate and the residue is extracted with two 150 milliliter portions of boiling diethyl ether. The ether extracts are then combined and evaporated in vacuo to yield 6.2 grams (47.4 percent of theory) of 4-[N-(O-ethylformimino)]-m-tolyl-N-methyl carbamate, M.P. 98–100° C.

EXAMPLE 3

In the same manner as Example 1, 72 grams (0.343 mole) of 3-nitro-p-tolyl-N-methylcarbamate, 58.3 grams of iron, 4.12 milliliters of 37 percent HCl, 68.6 milliliters of water, and 85.7 milliliters of ethanol are combined to yield 40.0 grams of 3-amino-p-tolyl-N-methylcarbamate.

EXAMPLE 4

3-[-N-(O-ethylformimino)]-p-tolyl-N-methylcarbamate

In the same manner as Example 2, approximately 10 grams (0.055 mole) of 3-amino-p-tolyl-N-methylcarbamate are combined with 14.9 grams of triethylorthoformate, about 50 milliliters of acetonitrile, and about 0.2 milliliters of alcoholic HCl to produce 3-[N-(O-ethylformimino)]-p-tolyl-N-methyl carbamate.

EXAMPLE 5

4-[N-(O-ethylacetimino)]-m-tolyl-N-methylcarbamate

In the same maner as Example 2, 10 grams (0.055 mole) of 4-amino-m-tolyl-N-methyl carbamate, 16.2 grams (0.1 mole) of triethyl orthoacetate, 50 milliliters of acetonitrile and 0.2 milliliters of alcoholic HCl are combined to yield 8.0 grams (57.8 percent of theory) of 4-[N-(O-ethylacetimino)] - m-tolyl-N-methylcarbamate, $n_D^{30}$ —1.5337.

EXAMPLE 6

In the same manner as Example 1, 10 grams (0.055 mole) of 4-amino-m-tolyl-N-methyl carbamate, 17.6 grams (0.1 mole) of triethyl orthopropionate, 50 milliliters of acetonitrile and 0.2 milliliters of alcoholic HCl are combined to yield 12.5 grams (85.3 percent of theory) of 4-[N-(O-ethylpropionimino)-m-tolyl-N-methyl carbamate, M.P. 84–86° C.

Compounds which may be produced according to the invention include:

(1) 4-[N-(O-ethylformimino)]-m-tolyl-N-methyl-carbamate
(2) 3-[-(O-ethylformimino)]-p-tolyl-N-n-butyl-carbamate
(3) 3-[N-(O-ethylacetimino)]-N-methylcarbamate
(4) 4-[N-(O-ethylformimino)]-m-tolyl-N-ethyl-carbamate
(5) 4-[N-(O-ethylpropionimino(]-3,5-dimethyl-phenyl-N-ethylcarbamate
(6) 4-[N-(O-n-butylformimino)]-m-tolyl-N-methyl-carbamate
(7) 4-[N-(O-ethylformimino)]-3,5-dimethylphenyl-N-methylcarbamate
(8) 4-[N-(O-ethylformimino)]-m-tolyl-N-propyl-carbamate
(9) 4-[N-(O-ethylpropionimino)]-3,5-dimethylphenyl-N-n-butylcarbamate
(10) 4-[O-ethylacetimino)]-m-propylphenyl-N-phenyl-carbamate
(11) 4-[N-(O-ethylacetimino)]-3-methyl-5-ethyl-phenyl-N-methylcarbamate
(12) 4-[N-(O-ethylpropionimino)]-3,5-dimethyl-phenyl-N-methylcarbamate
(13) 3-[N-(O-ethylpropionimino)]-3,5-dimethyl-phenyl-N-methylcarbamate
(14) 3-[N-(O-ethylacetimino)]-p-propylphenyl-N-methylcarbamate
(15) 3-[N-(O-butylacetimino)]-3,5-dimethylphenyl-N-methylcarbamate
(16) 3-[N-(O-ethylformimino)]-p-tolyl-N-methyl-carbamate
(17) 4-[N-(O-ethylpropionimino)]-m-tolyl-N-methyl-carbamate
(18) 4-[N-(O-ethylacetimino)]-m-tolyl-N-methyl-carbamate
(19) 4-[N-(O-ethylacetimino)]-m-ethylphenyl-N-methylcarbamate
(20) 3-[N-(O-ethylformimino)]-o-tolyl-N-ethyl-carbamate
(21) 4-[N-(O-propylpropionimino)]-m-tolyl-N-methylcarbamate
(22) 3-[N-(O-ethylpropionimino)]-N-methylcarbamate
(23) 4-[N-(O-ethylformimino)]-m-tolyl-N-n-butylcarbamate
(24) 3-[N-(O-ethylformimino)]-p-tolyl-N-isopropyl-carbamate
(25) 4-[N-(O-ethylacetimino)]-3,5-dimethylphenyl-N-methylcarbamate
(26) 3-[N-(O-propylpropionimino)]-p-tolyl-N-methylcarbamate As indicated, the compounds of the invention are useful as insecticides. In order to demonstrate such activity, the following tests were conducted, utilizing the compounds designated as 1, 3, 12, 17, 18 and 25.

(I) HOUSE FLY [MUSCA DOMESTICA (L.)]

(A) Film residue

A stock solution containing 100 μg./ml. of the toxicant in an appropriate solvent, e.g., acetone, was prepared. Aliquots of this solution are combined with one ml. of an acetone-peanut oil solution in a dish, 55 mm. in diameter, and allowed to dry. The aliquots were varied to achieve desired toxicant concentrations ranging from 100 μg. per dish to that at which 50% mortality was obtained. The dishes were placed in a circular cardboard cage, closed on the bottom with cellophane, and covered on top with cloth netting. Twenty-five female house flies were introduced into the cage and the percent mortality was recorded after 48 hours. The LD–50 values are expressed in terms of μg. per 25 female flies. The results of this test are given in the table below under "HF."

(II) GERMAN COCKROACH [BLATELLA GERMANICA (LINNÉ)]

Ten approximately one-month old nymphs of the German cockroach were placed in a circular cardboard cage sealed on one end with cellophane and covered by cloth netting on the other. Aliquots of the toxicant, dissolved in an appropriate solvent, were diluted in water to which had been added 0.002% of a conventional wetting agent Sponto 221 (a polyoxy-ethylene sorbitan monolaurate ether of alkylated phenol blended with organic sulfonates). Test concentrates ranged from 0.1% downward to that at which 50% mortality is obtained. Each of these aqueous suspensions were sprayed onto the insects, through the cloth netting, by means of hand-spray gun. Percent mortality in each case was recorded after 72 hours, and the LD–50 values expressed as percent of toxicant in the aqueous spray were recorded. The results are listed in the table under the column "GR."

(III) LYGUS BUG [LYGUS HESPERUS (KNIGHT)]

The procedure involved in this test was essentially the same as that employed for the German cockroach test, except that the test concentrations ranged from 0.05% to that at which 50% mortality was obtained. The results are listed in the table under "LB."

(IV) BLACK BEAN APHID [APHIS FABAE (SCOP.)]

Nasturtium (Tropaeolum sp.) plants, approximately 2–3 inches tall, are transplanted into sandy loam soil in 3 inch clay pots and infested with 50–75 aphids of mixed ages. Twenty-four hours later they are sprayed, to the point of runoff, with aqueous suspensions of the toxicant. The suspensions are prepared as in previously described tests (II, III and IV). Test concentrations ranged from 0.05% to that at which 50% mortality is obtained.

Mortality is recorded after 48 hours and the LD-50 values are expressed as percent active ingredient in the aqueous suspension. The results are indicated in the table under the heading "BA."

TABLE

| Compound numbers | HF | GR | LB | BA |
|---|---|---|---|---|
| (1) | 80 | >0.1 | 0.005 | 0.03 |
| (3) | 95 | >0.1 | 0.03 | >.05 |
| (6) | >100 | 0.08 | 0.008 | 0.008 |
| (12) | 40 | >0.1 | 0.03 | 0.05 |
| (17) | 30 | 0.1 | 0.01 | 0.008 |
| (18) | 40 | >0.1 | 0.005 | 0.008 |
| (25) | 30 | >0.1 | 0.008 | 0.003 |

As may be seen from the above table, the compositions of the invention exhibit good insecticidal activity. The compounds may be applied directly to the insects or may be applied to a locus to be protected. In general, it is not contemplated that the compounds be applied to humans. In any event, it is, or course, necessary that the insects receive an effective or insecticidal dosage or amount, i.e., an amount sufficient to kill the insects. Since the amount of active agent required will vary according to the insects treated, precise limits on the amounts employed cannot be given. The tests set forth above indicate exemplary amounts which may be employed, as will readily be appreciated by those of skill in the art. Determination of the optimum effective concentration for a specific application is readily conducted by routine procedures, as will also be apparent to those skilled in the art.

The compounds are normally employed with a suitable carrier and may be applied as a dust, spray, drench, or aerosol. The compounds thus may be applied in combination with solvents, diluents, various surface active agents (for example detergents, soaps or other emulsifying or wetting agents, surface active clays) carrier media, adhesives, spreading agents, humectants and the like. They may also be combined with other biologically active compositions, including other insecticides, fungicides, bactericides, and algaecides, etc., as well as with fertilizers, soil modifiers, etc. The compounds of the invention may be used in combination with an inert carrier and a surface active or emulsifying agent, and may also be applied in combination with other biologically active materials, in conjunction with a carrier and a surface active or emulsifying agent. The solid and liquid formulations can be prepared by any of the conventional methods well-known by those skilled in the art. The compositions may be applied to or in textiles, leather, paint, soaps, paper, wood plastic, oil, and other substances.

Various changes and modifications may be made without departing from the spirit and the scope of the invention described herein, as will be apparent to those skilled in the art to which it pertains.

What is claimed is:

1. A compound having the formula:

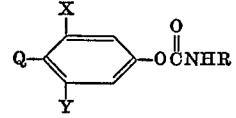

wherein R is alkyl containing 1 through 4 carbon atoms; X is selected from the group consisting of hydrogen and alkyl containing 1 through 6 carbon atoms; Q is selected from the group of hydrogen and

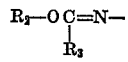

wherein $R_2$ is alkyl containing 1 through 6 carbon atoms, and $R_3$ is selected from the group consisting of hydrogen and alkyl containing 1 through 6 carbon atoms; and Y is selected from the group consisting of hydrogen, alkyl containing 1 through 6 carbon atoms, or

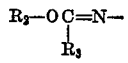

wherein $R_2$ is alkyl containing 1 through 6 carbon atoms, $R_3$ is selected from the group consisting of hydrogen and alkyl containing 1 through 6 carbon atoms; provided that when Q is hydrogen, Y is

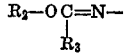

wherein $R_3$ is alkyl containing 1 through 4 carbon atoms, and when Q is

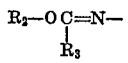

Y is alkyl containing 1 through 6 carbon atoms.

References Cited
UNITED STATES PATENTS
3,404,975   10/1968   Wilson et al. _____ 260—479

JAMES A. PATTEN, Primary Examiner

U.S. Cl. X.R.
424—300

PO-1050
(5/69)

UNITED STATES PATENT OFFICE
CERTIFICATE OF CORRECTION

Patent No. 3,780,091      Dated December 18, 1973

Inventor(s) Arnold D. Gutman

It is certified that error appears in the above-identified patent and that said Letters Patent are hereby corrected as shown below:

In Column 2, Example 2, line 66 "4-amino-m-" should read ---4-amino-m- ---.

In Column 3, Example 2, line 4 "-m-tolyl-N-methyl" should read --- -m-tolyl-N-methyl---.

In Column 3, Example 5, line 27 "4-amino-m-tolyl-N-methyl" should read ---4-amino-m-tolyl-N-methyl---.

In Column 3, Example 5, line 31 "-m-tolyl-N-methylcarbamate" should read --- -m-tolyl-N-methylcarbamate---.

In Column 3, Example 6, line 36 "4-amino-m-tolyl-N-methyl" should read ---4-amino-m-tolyl-N-methyl---.

In Column 3, Example 6, line 40 "-m-tolyl-N-methyl" should read --- -m-tolyl-N-methyl---.

In Column 3, Example 6, Compound No. (1) "-m-tolyl-N-methylcarbamate" should read --- -m-tolyl-N-methylcarbamate---.

In Column 3, Example 6, Compound No. (2) "3-[-(O-ethylformimino)" should read ---3-[N-(O-ethylformimino)---.

In Column 3, Example 6, Compound No. (4) "-m-tolyl-N-ethylcarbamate" should read --- -m-tolyl-N-ethylcarbamate---.

In Column 3, Example 6, Compound No. (5) "[N-(O-ethylpropionimino(]" should read ---[N-(O-ethylpropionimino)]---.

In Column 3, Example 6, Compound No. (6) "-m-tolyl-N-methylcarbamate" should read --- -m-tolyl-N-methylcarbamate---.

In Column 3, Example 6, Compound No. (8) "-m-tolyl-N-propyl-" should read --- -m-tolyl-N-propylcarbamate---.

Signed and sealed this 12th day of November 1974.

(SEAL)
Attest:

McCOY M. GIBSON JR.      C. MARSHALL DANN
Attesting Officer      Commissioner of Patents